United States Patent [19]

Steinert et al.

[11] 4,074,119
[45] Feb. 14, 1978

[54] CODE WORD DETERMINATION

[75] Inventors: Wolfgang Steinert, Backnang, Germany; Bo Ekström, Stockholm, Sweden

[73] Assignee: Licentia Patent-Verwaltungs-G.m.b.H., Frankfurt am Main, Germany

[21] Appl. No.: 693,911

[22] Filed: June 8, 1976

[51] Int. Cl.$^2$ .......................... G06G 7/12; H04L 7/00
[52] U.S. Cl. ...................................... 364/807; 325/42; 325/320; 329/104; 329/129
[58] Field of Search ............... 235/184, 193, 194, 196; 325/60, 320, 41, 42, 65, 323, 472, 473; 178/67, 68, 69.5 R; 329/104, 129, 130; 179/15 BC

[56] References Cited

U.S. PATENT DOCUMENTS

| 3,568,066 | 3/1971 | Fujimara | 325/320 |
| 3,838,350 | 9/1974 | Ewanus et al. | 329/104 |
| 3,855,533 | 12/1974 | Schüeli | 178/69.5 R X |
| 3,891,959 | 6/1975 | Tsuji et al. | 178/67 X |
| 3,993,956 | 11/1976 | Gilmore et al. | 325/320 |

Primary Examiner—Joseph F. Ruggiero
Attorney, Agent, or Firm—Spencer & Kaye

[57] ABSTRACT

A method and circuit for determining a unique word contained in received signals in a transmission system which operates with a multiple phase type of modulation at the transmitter and coherent demodulation at the receiver, the unique word being transmitted only as signals in two phases which are 180° apart and the received signals being divided into orthogonal voltage components during demodulation, a single value whose algebraic sign is indicative of the unique word being derived by dividing the orthogonal components to form a quotient signal representative of the ratio therebetween, integrating the quotient signal over a plurality of clock pulse periods, multiplying the integrated quotient signal with one of the orthogonal components, and adding the resultant product signal to the other orthogonal component to form the single value.

2 Claims, 1 Drawing Figure

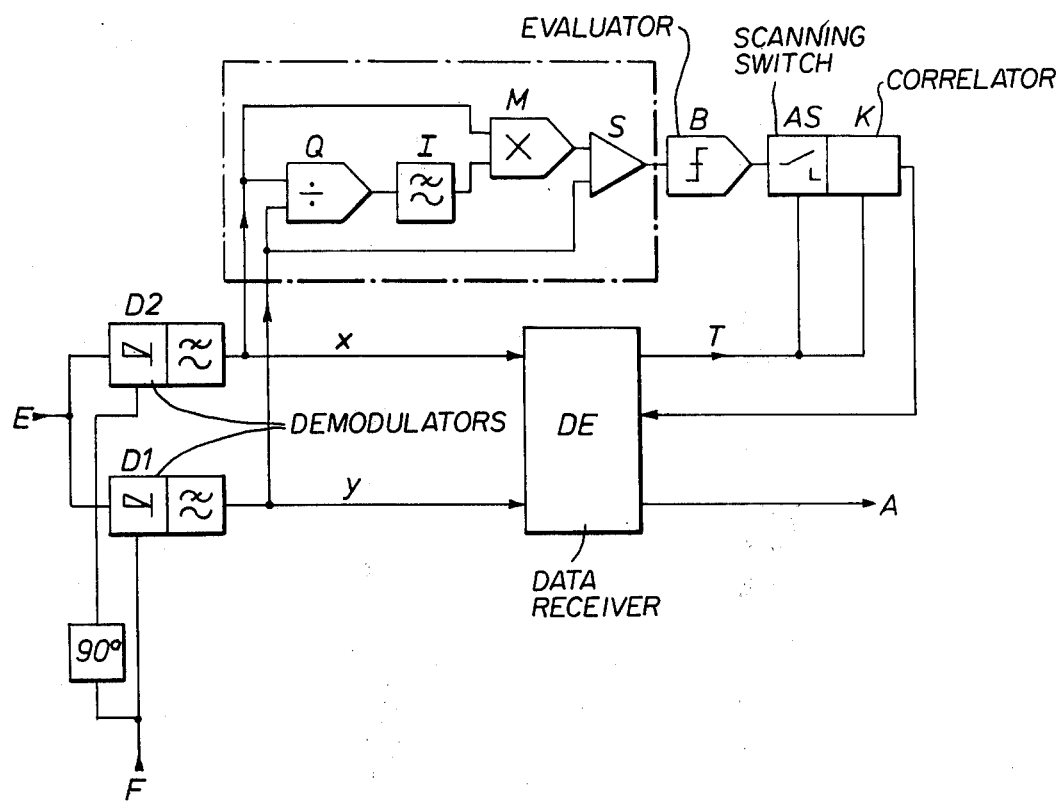

CODE WORD DETERMINATION

BACKGROUND OF THE INVENTION

The present invention relates to data transmission procedures, and particularly procedures involving multiple phase modulated digital signals.

In data transmission systems it is usually necessary to transmit, in addition to the useful information, certain code words of fixed content and agreed-upon meaning, known as unique words, for example to define those certain points in time which identify the beginning of a long sequence of signals or an address.

At the receiving end, these unique words must be recognizable with the greatest possible certainty. This is made difficult due to noise which is superposed on the signals as well as superposed interference signals, mainly when transmission takes place in multiple phase modulation. With two-phase, or quadrature, modulation the identification of unique words is more dependable.

In the system described by A. Ogawa and M. Ohkawa under the title "A New Eight-Phase Modem System for TDMA" as contribution D4 to the conference report of the Second International Conference on Digital Satellite Communication, Paris, France, November, 1972, such unique words are transmitted in two-phase modulation. A special two-phase demodulator, which has its input connected in parallel with the input of the multiple-phase demodulator, is provided to receive these unique words. While this arrangement seems to be unacceptably expensive, the fabrication expense for the transmitting end is relatively low.

With $m$ phase modulation, where $m$ generally is a power of 2, a number equal to the logarithm to base 2 of $m$, or $ld\ m$, consecutive bit positions of the data to be transmitted are combined into a code word and during transmission each one of the m possible code words is identified by an assigned phase position of the carrier frequency with respect to a reference frequency. The phase angles of the modulated signals may be even numbered or, as is more commonly the case, odd numbered multiples of the angle $\pi/m$. At the receiving end, the stepping clock pulse can be recovered with greater certainty from signals whose phase angles are odd-numbered multiples of the angle $\pi/m$. It is known and customary to obtain the odd-numbered multiples from the even-numbered multiples of angle $\pi/m$ by axis transformation.

Two-phase signals for the unique code word result if the latter is designed so that with the combination of $ld\ m$ bit positions only two given code words result, in the simplest case if a whole-number multiple of $ld\ m$ successive bit positions are identical in the unique word, i.e., if the stepping clock pulse for the unique word is $ld\ m$ times longer than the stepping clock pulse for the data to be transmitted.

SUMMARY OF THE INVENTION

It is an object of the present invention to enable unique words which are transmitted as two-phase signals to be detected with the smallest probability of error from the four phase or multiple phase signals in which they are contained.

In the known processes for $m$-phase demodulation, the required reference carrier has any desired one of $m$ possible phase positions with respect to the received carrier. No process is known, however, with which the reference carrier can be forced into the particular phase position required to demodulate the two-phase signals.

These and other objects according to the invention are achieved, in a method and circuit for determining a unique word contained in received signals in a transmission system operating with multiple phase modulation or multiple phase difference modulation at the transmitter and coherent demodulation at the receiver, and in which successive signal increments are transmitted and received during successive clock periods, the unique word being transmitted only as signals in two phases which are 180° apart, and the received signals being divided into two orthogonal voltage components during demodulation, the two components representing the amplitude and phase angle of a received signal relative to a selected reference phase, by forming a single value for the two-phase signal by deriving a quotient signal representing the ratio of the amplitudes of the orthogonal components for each signal increment, integrating the resulting quotient signal over a plurality of clock periods, deriving a product signal representing the product of the integrated quotient signal and one of the orthogonal components for each signal increment, and deriving a sum signal representing the sum of the resulting product signal and the other orthogonal component for each signal increment, the value of which sum signal constitutes the single value, and by then evaluating the sum signal on the basis of its algebraic sign.

In carrying out this method, it is assumed that none of the coordinate values will take on the value zero, i.e., that the received signals have phase angles which are approximately equal to the odd-numbered multiples of angle $\pi/m$ or, as explained above, have already been transformed to such angles.

According to the method of the invention, the value indicating the coordinates of the signals in the phase plane will always result in only one of two values of the same magnitude but different algebraic sign if there are but two possible phase positions, independent of the actual phase positions of the signals. It can be proven that use of the method of the invention improves the signal to noise ratio for the newly derived value by at least 3 db, this occurring at $m = 4$, and the ratio increasing with m. The unique word to be detected can thus be identified with greater certainty in received signals containing a large amount of noise.

BRIEF DESCRIPTION OF THE DRAWING

The sole FIGURE is a simplified circuit diagram showing the most important modules of the receiving end of a conventional multi-phase modem combined with one embodiment of an arrangement for practicing the method of the invention.

DESCRIPTION OF THE PREFERRED EMBODIMENTS

In the operation of the receiver shown in the FIGURE, phase-modulated signals arriving through input E are demodulated in demodulators D1 and D2, which are controlled respectively by the reference carrier frequency signal F and that signal phase shifted by 90°, and thus produce representations of the component values along the orthogonal coordinates $x$ and $y$. A data receiver DE having inputs connected to the outputs of demodulators D1 and D2 reproduces from the $x$ and $y$ values the original useful information, emits it via output A, and also furnishes clock pulses T derived from the received signals. The FIGURE further shows the known modules used to locate a unique word in a signal sequence which include an evaluator B, a scanning switch AS controlled by clock pulses T, and a correlator K which upon detection of the unique word, furnishes a signal, e.g. a start signal, to data receiver DE. All of the components described thus far are well-known and standard in the art.

Since the designations $x$ and $y$ are arbitrarily assigned to the coordinate values, they can be considered to be interchangeable in the following description and in the exemplary circuit.

Known modules employed in the analog computer art can be employed to practice the method according to the invention. An arrangement for carrying out the invention is shown in the dot-dash box and includes a divider Q, a multiplier M and a summing member S, each having two inputs, and an integrating member I. A first one of the two orthogonal component values is fed both to the dividend input of the divider Q and to a first input of the multiplier M, and the second orthogonal component value is fed both to the divisor input of the divider Q and to a first input of the summing member S. The integrating member I, for example structurally similar to a simple low-pass filter, is connected in series with the output of the divider Q to integrate the quotient values obtained from a plurality of preceding clock pulse periods.

The output of the integrating member i is connected to the second input of the multiplier M and the output of the multiplier M is connected with the second input of the summing member S. At the output of the summing member S the value of the two-phase signal which is to be evaluated can be obtained.

Only the algebraic sign of the values obtained by the above-described arrangement is decisive for the evaluation. Processes and arrangements suitable for such evaluation are known. The drawing FIGURE shows, as the evaluator B, a signum element which emits $+1$ or $-1$ values, respectively, without consideration of the amplitude fed thereinto, merely in dependence on the algebraic sign of the value it receives. A signum element is comparable to a limiter except that the slope of the response of a signum element is infinite.

The output signals from the evaluator are interrogated at given intervals by a scanning switch AS, which is controlled by clock pulses T, and are fed to correlator K which, when it receives a unique word which can be considered correct with sufficient probability, feeds a signal, for example a starting signal, to data receiver DE.

It will be understood that the above description of the present invention is susceptible to various modifications, changes and adaptations, and the same are intended to be comprehended within the meaning and range of equivalents of the appended claims.

What is claimed is:

1. In a method for determining a unique word contained in received signals in a transmission system operating with multiple phase modulation or multiple phase difference modulation at the transmitter and coherent demodulation at the receiver and in which successive signal increments are transmitted and received during successive clock periods, the unique word being transmitted only as signals in two phases which are 180° apart, and the received signals being divided into two orthogonal voltage components during demodulation, the two components representing the amplitude and phase angle of a received signal relative to a selected reference phase, the improvement comprising: forming a single value for the two-phase signal by deriving a quotient signal representing the ratio of the amplitudes of the orthogonal components for each signal increment, integrating the resulting quotient signal over a plurality of clock periods, deriving a product signal representing the product of the integrated quotient signal and one of the orthogonal components for each signal increment, and deriving a sum signal representing the sum of the resulting product signal and the other orthogonal component for each signal increment, the value of which sum signal constitutes the single value; and evaluating the sum signal on the basis of its algebraic sign.

2. In a receiver of a transmission system operating with multiple phase modulation or multiple phase difference modulation transmission and coherent demodulation reception and in which a unique word is transmitted only as signals in two phases which are 180° apart and the received signals are divided during demodulation into two orthogonal voltage components representing the amplitude and relative phase angle of a received signal, the improvement comprising a circuit for producing a single value whose algebraic sign is determinative of the two-phase signal and including: divider means connected to receive the two orthogonal components of the received signals for producing a quotient signal representing the ratio of the amplitudes of such components; multiplier means connected to receive the quotient signal from said divider means and one of the orthogonal components for producing a product signal representing the product of its received signals; and summing means connected to receive the product signal from said multiplier means and the other one of the orthogonal components for producing a sum signal representing the sum of its received signals and constituting the single value.

* * * * *